US007746897B2

(12) United States Patent
Stephenson et al.

(10) Patent No.: US 7,746,897 B2
(45) Date of Patent: Jun. 29, 2010

(54) EXPEDITED BANDWIDTH REQUEST FOR EMERGENCY SERVICES FOR WIRELESS CLIENTS

(75) Inventors: David Sheldon Stephenson, San Jose, CA (US); Timothy S. Olson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 446 days.

(21) Appl. No.: 11/395,720

(22) Filed: Mar. 31, 2006

(65) Prior Publication Data

US 2007/0195818 A1 Aug. 23, 2007

Related U.S. Application Data

(60) Provisional application No. 60/774,291, filed on Feb. 17, 2006.

(51) Int. Cl.
*H04J 3/00* (2006.01)
*H04J 3/16* (2006.01)
*H04L 12/413* (2006.01)
*G01R 31/08* (2006.01)
*H04W 4/00* (2009.01)
*H04W 72/00* (2009.01)
*H04B 7/212* (2006.01)

(52) U.S. Cl. .............. 370/468; 455/452.2; 455/521; 370/348; 370/230; 370/338; 370/444

(58) Field of Classification Search ............. 455/452.2, 455/521; 370/468, 348, 230, 338, 444
See application file for complete search history.

(56) References Cited

U.S. PATENT DOCUMENTS 6,889,048 B1 * 5/2005 Koo ................. 455/452.1

| | | | |
|---|---|---|---|
| 2002/0028690 A1 * | 3/2002 | McKenna et al. | 455/517 |
| 2002/0071444 A1 * | 6/2002 | Aschir | 370/437 |
| 2003/0074443 A1 * | 4/2003 | Melaku et al. | 709/224 |
| 2003/0114159 A1 * | 6/2003 | Park et al. | 455/436 |
| 2003/0223431 A1 * | 12/2003 | Chavez et al. | 370/395.42 |
| 2004/0057456 A1 * | 3/2004 | He et al. | 370/465 |
| 2005/0003797 A1 * | 1/2005 | Baldwin | 455/404.1 |
| 2006/0064497 A1 * | 3/2006 | Bejerano et al. | 709/228 |
| 2006/0165103 A1 * | 7/2006 | Trudeau et al. | 370/401 |
| 2007/0155362 A1 * | 7/2007 | Davis | 455/404.1 |
| 2008/0088428 A1 * | 4/2008 | Pitre et al. | 340/506 |

OTHER PUBLICATIONS

Maria Jose Perez-Luque and Thomas D.C. Little, *A Temporal Reference Framework for Multimedia Synchronization*, IEEE Journal on Selected Areas in Communications, vol. 14, No. 1, Jan. 1996, pp. 36-51.

(Continued)

*Primary Examiner*—Vincent P Harper
*Assistant Examiner*—Ariel Balaoing
(74) *Attorney, Agent, or Firm*—Baker Botts L.L.P.

(57) ABSTRACT

Methods, apparatuses, and systems directed to reliably providing emergency services to wireless clients. In one embodiment, a wireless client determines if an attempt to transmit an emergency message exists. If so, the wireless client determines if one or more wireless access points support expedited bandwidth capabilities. If so, the wireless client notifies one of the wireless access points that the wireless client has an expedited bandwidth request.

19 Claims, 9 Drawing Sheets

OTHER PUBLICATIONS

Yutaka Ishibashi and Shuji Tasaka, *A Synchronization Mechanism for Continuous Media in Multimedia Communications*, Department of Electrical and Computer Engineering, Nagoya Institute of Technology, Nagoya 466, Japan. Copyright 1995 IEEE.

Chandong, Liu, Yong Zie, Myung J. Lee and Tarek N. Saadawi, *Multipoint Multimedia Teleconference System with Adaptive Synchronization*, IEEE Journal on Selected Areas in Communications, vol. 14, No. 7, Sep. 1996, pp. 1422-1435.

Gerold Blakowski and Ralf Steinmetz, *A Media Synchronization Survey: Reference Model, Specification and Case Studies, IEEE Journal on Selected Areas in Communications*, vol. 14, No. 1, Jan. 1996, pp. 5-35.

Colm Elliott, *Stream Synchronization for Voice over IP Conference Bridges*, Department of Electrical and Computer Engineering, McGill University, Montreal, Canada. Copyright 2004 Colm Elliott.

James M. Polk, *SIP Extension for MLPP*, Internet Working Draft Memo, Cisco Systems, Mar. 1, 2001.

James M. Polk, *SIP Precedence mapping to MLPP Interworking*, Internet Working Draft Memo, Cisco Systems, Mar. 28, 2000.

\* cited by examiner

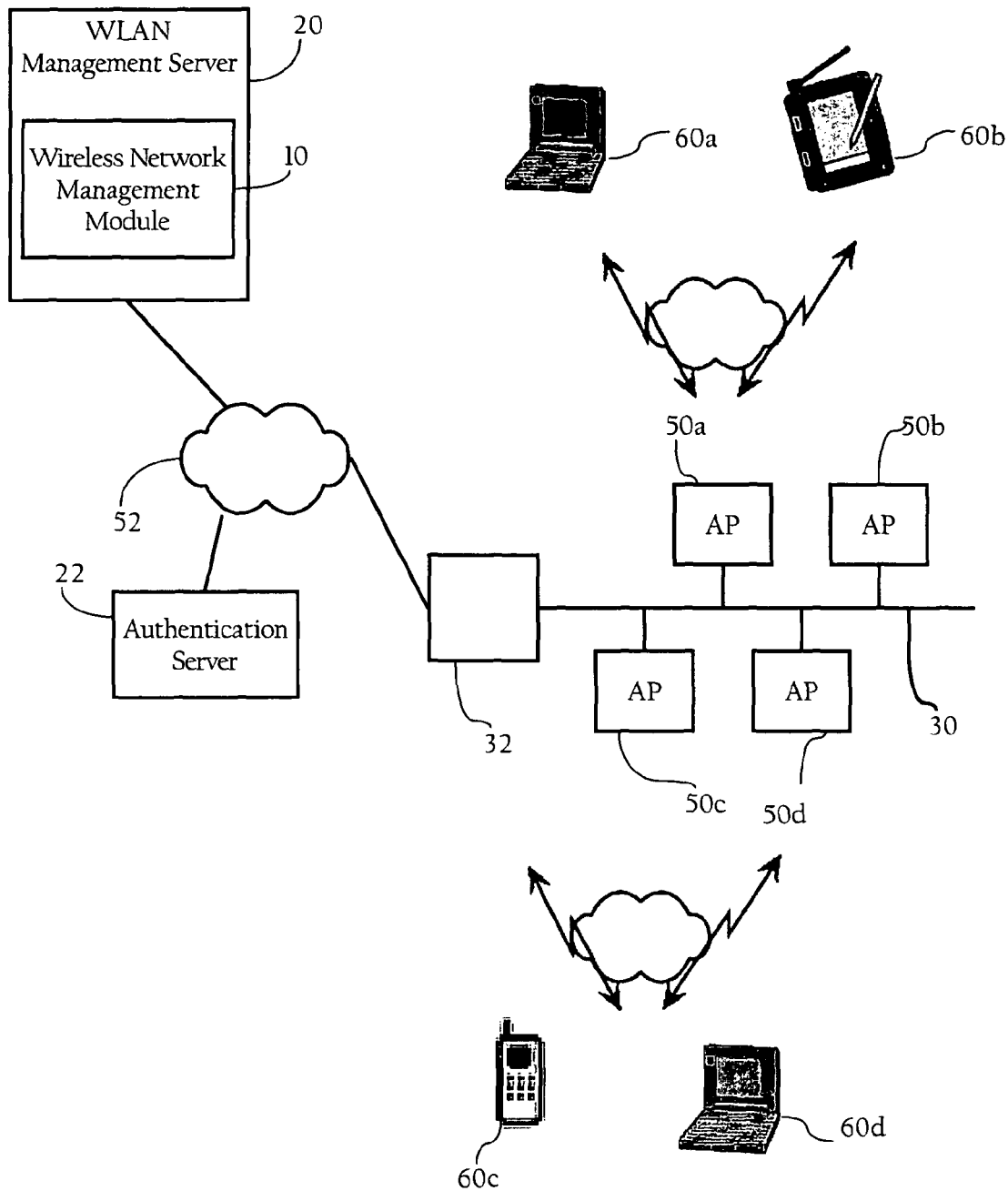
Fig._1A

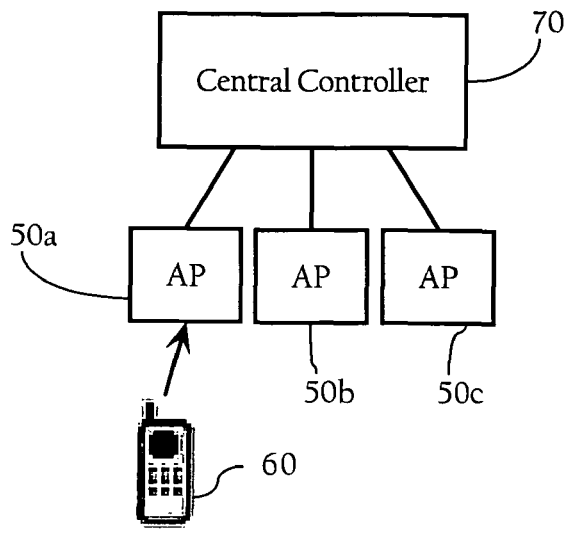
Fig._1B
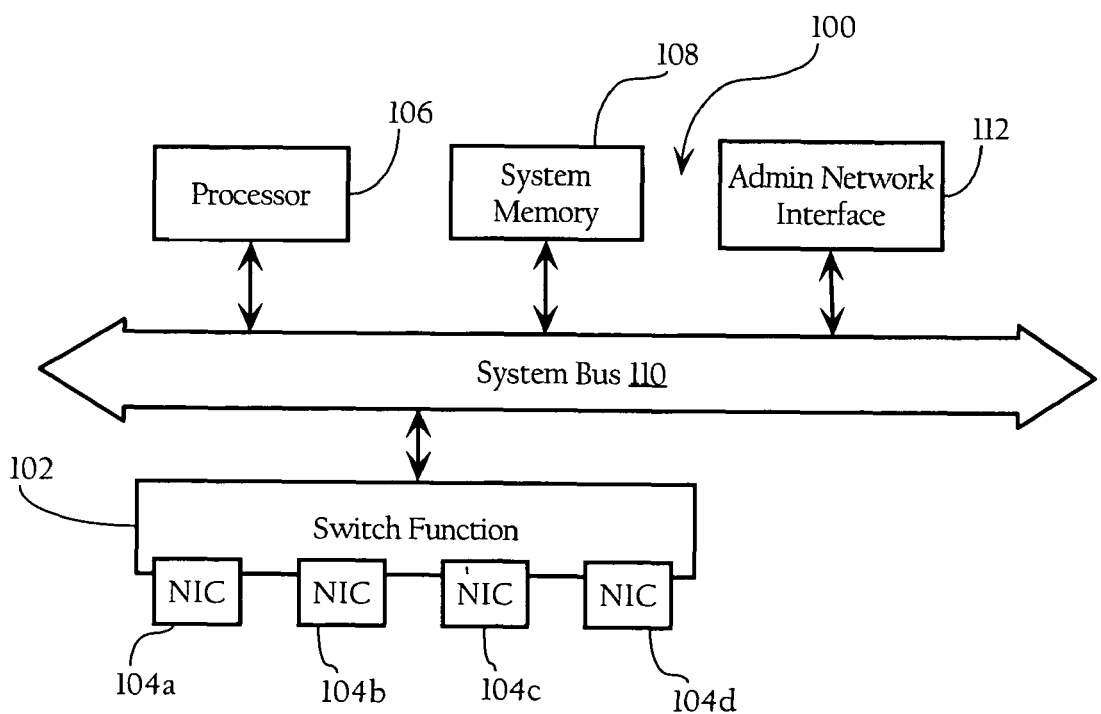
Fig._1C

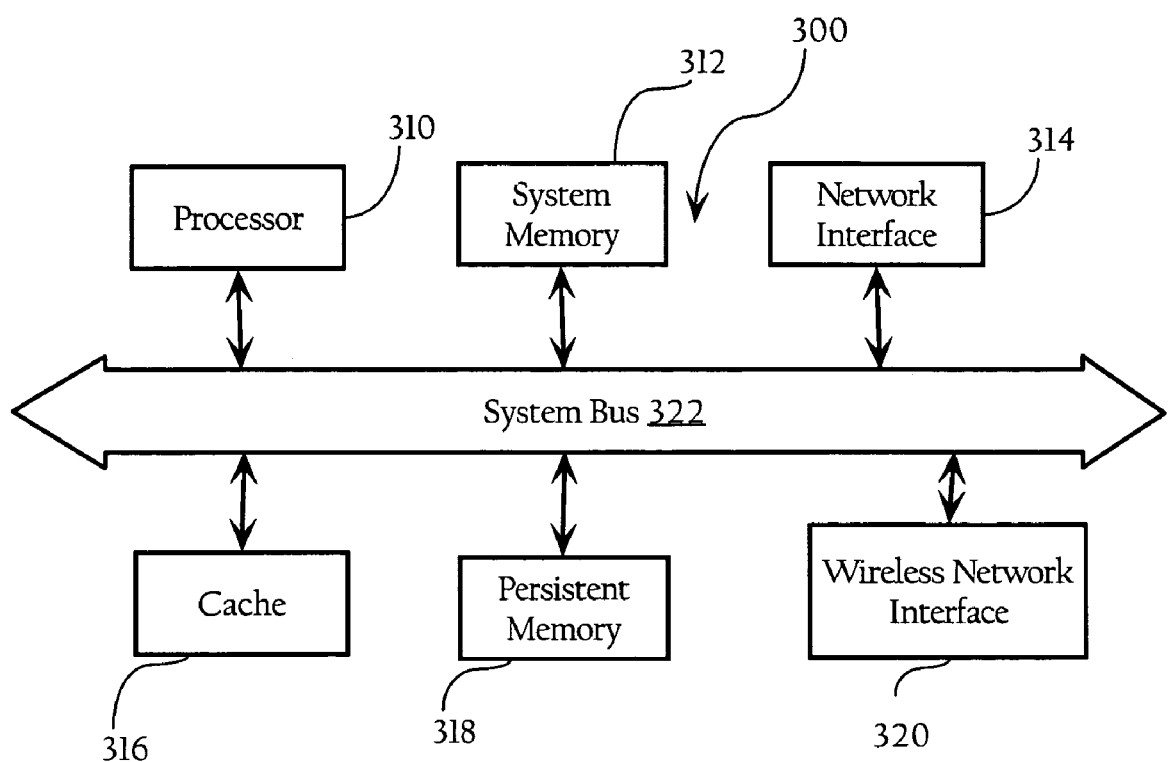
Fig._2

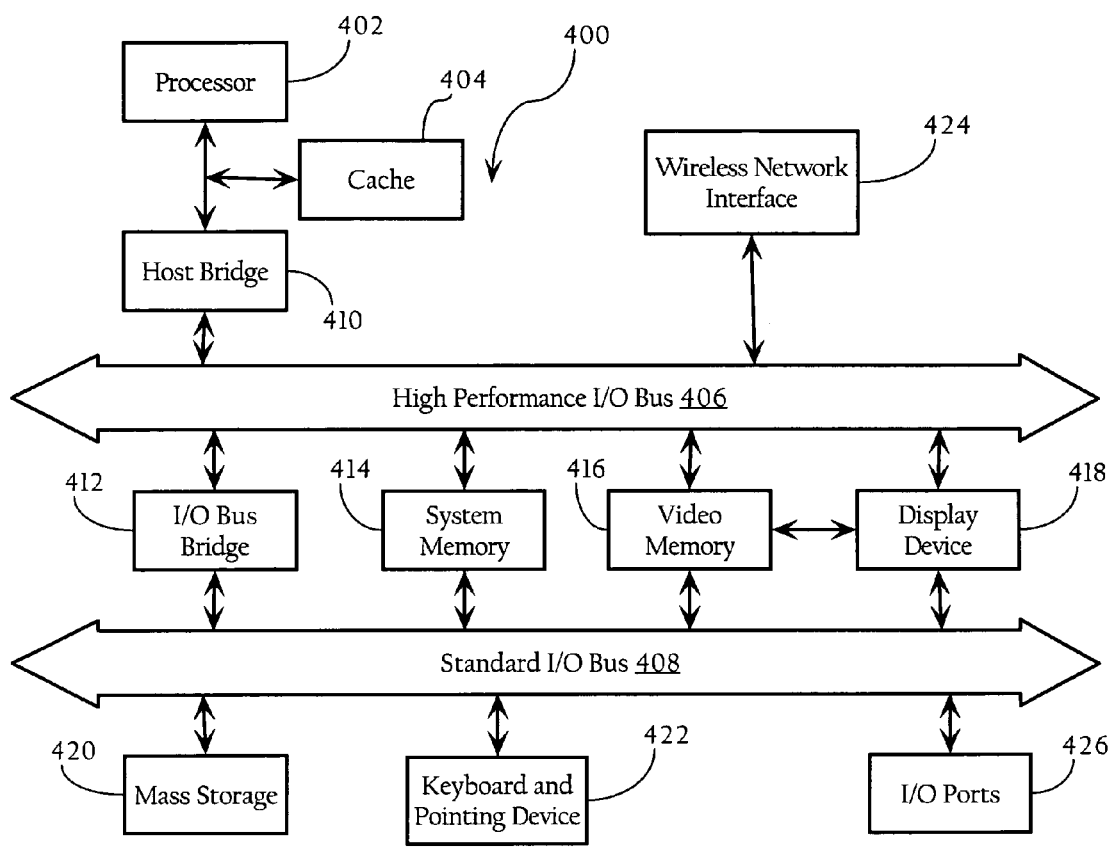
Fig._3

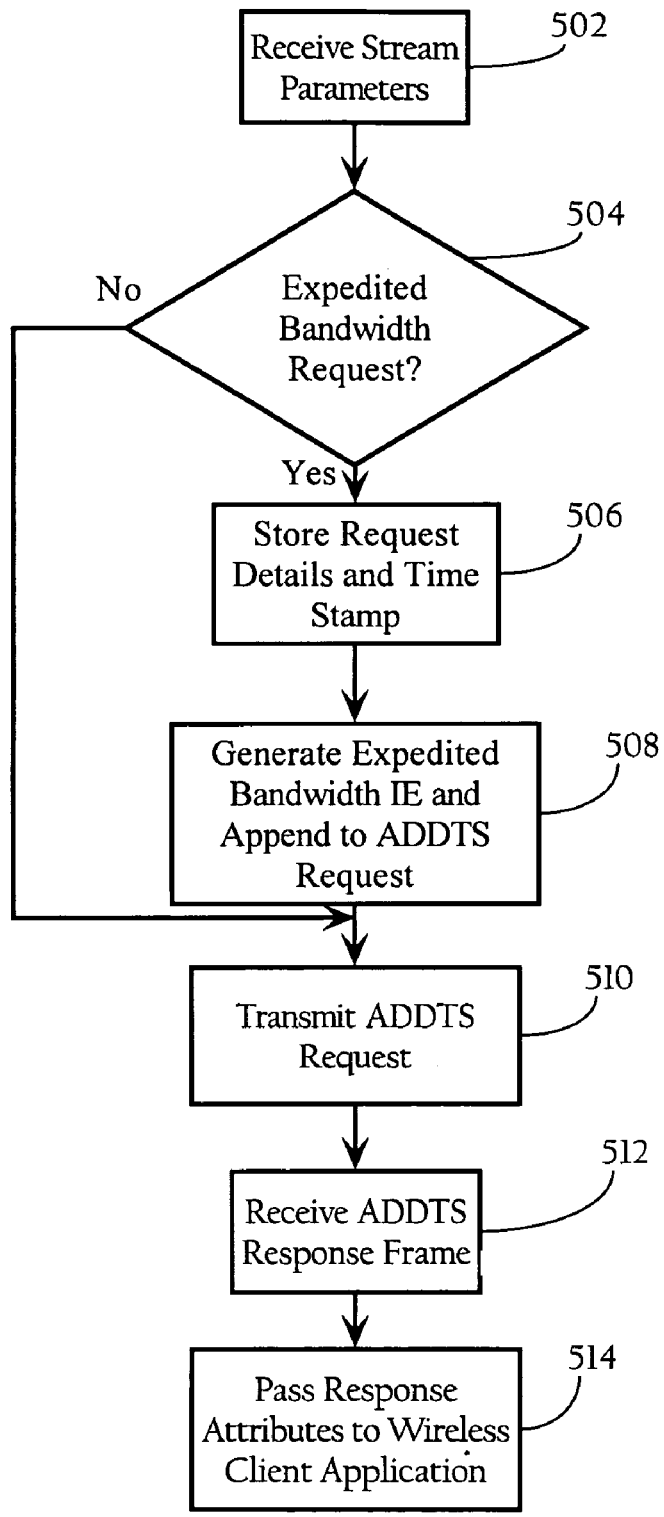
Fig._4A

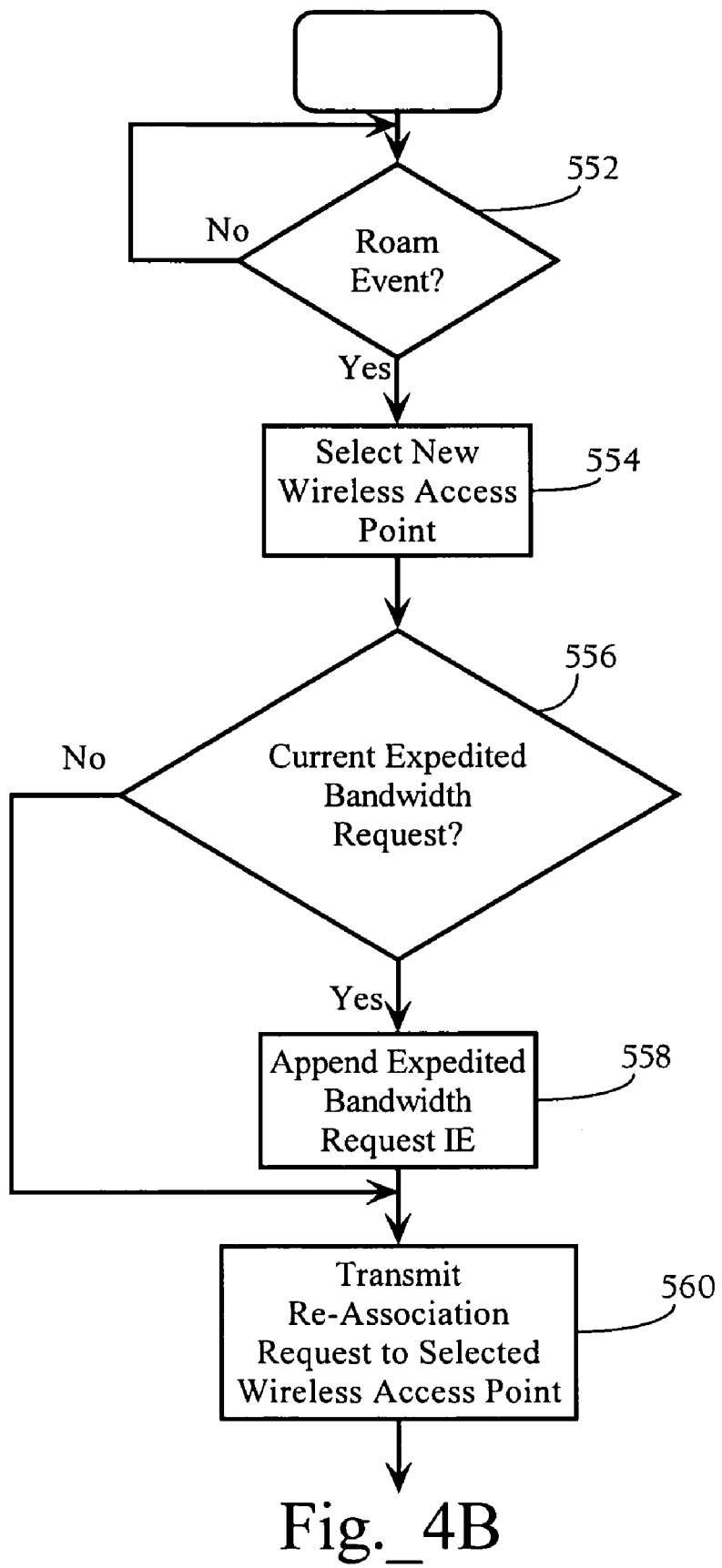
Fig._4B

| | Element ID | Length | TSID | Bandwidth Use |
|---|---|---|---|---|
| Octets: | 1 | 1 | 1 | 1 |

Fig._5

| BW Use value | Description |
|---|---|
| 0 | Emergency call |
| 1 | First Responder (public) entity) |
| 2 | First Responder (private) entity) |
| 3 | MLPP Level A |
| 4 | MLPP Level B |
| 5 | MLPP Level 0 |
| 6 | MLPP Level 1 |
| 7 | MLPP Level 2 |
| 8 | MLPP Level 3 |
| 9 | MLPP Level 4 |
| 10-255 | Reserved |

Fig._6

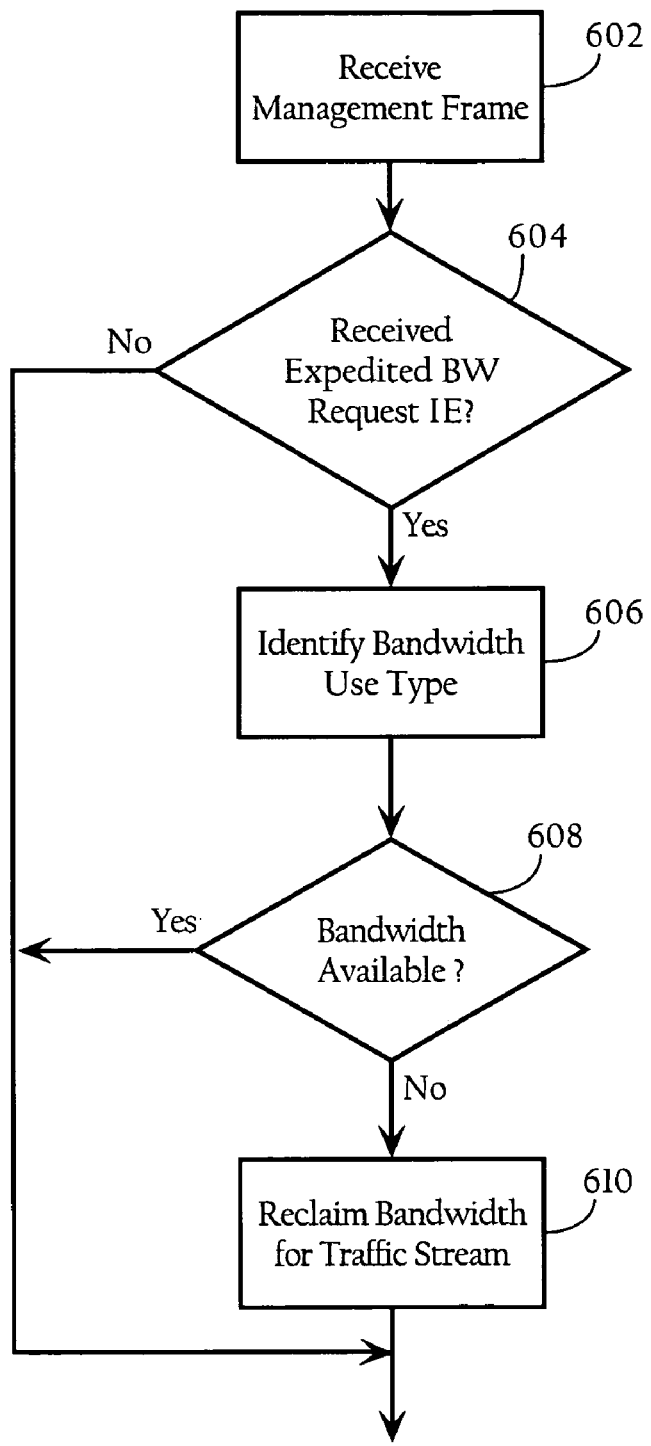
Fig._7

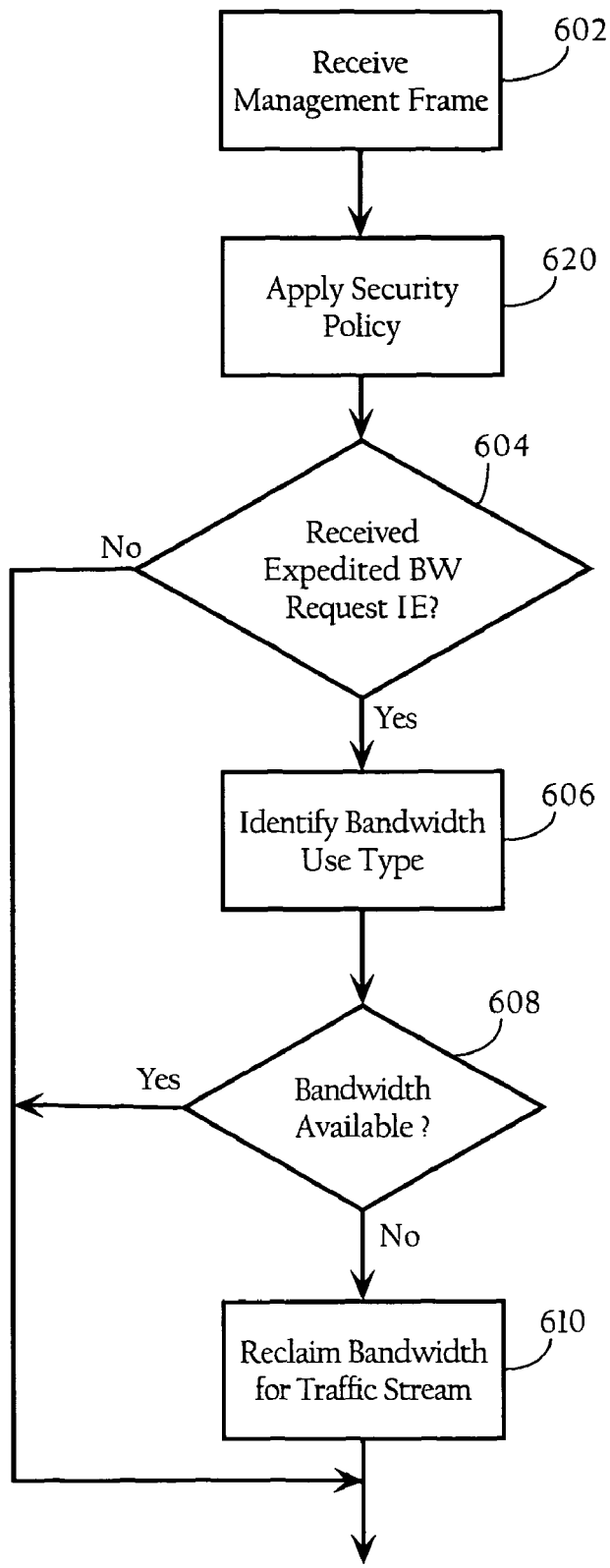
Fig._8A

EXPEDITED BANDWIDTH REQUEST FOR EMERGENCY SERVICES FOR WIRELESS CLIENTS

RELATED APPLICATION

The present application claims priority to U.S. provisional patent application Ser. No. 60/774,291 filed Feb. 17, 2006.

FIELD OF THE INVENTION

The present invention relates to wireless networks and, more particularly, to methods, apparatuses, and systems directed to reliably providing emergency and/or expedited services to wireless clients.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their networks.

Admission control is a technique used in bandwidth-constrained networks or over bandwidth-allocated links to manage the effects of congestion. In wireless local area networks (WLANs), wireless clients may request bandwidth for Quality of Service (QoS) services via a traffic specification (TSPEC) request according to the IEEE 802.11e specification or the Wi-Fi Alliance's Wi-Fi Multimedia (WMM) specification. In response to this request, a wireless access point will attempt to admit the QoS flow if over-the-air (OTA) bandwidth is available. A policy configured by a system administrator permits this operation. One characteristic of admission control is that a wireless access point will continue to accept and admit new QoS flows, but only until the OTA bandwidth is used up or until the OTA usage reaches a pre-defined threshold set by the system administrator. Once this occurs, subsequent requests for OTA bandwidth are denied.

DESCRIPTION OF THE DRAWINGS

FIG. 1A is a topological diagram of the components in a wireless local area network (WLAN) system according to one implementation of the present invention.

FIG. 1B illustrates a hierarchical wireless network including a central controller, according to one implementation of the present invention.

FIG. 1C illustrates for didactic purposes a hardware system, which may be used to implement a central controller.

FIG. 2 illustrates for didactic purposes a hardware system, which may be used to implement a wireless access point.

FIG. 3 illustrates for didactic purposes a hardware system, which may be used to implement a wireless client.

FIG. 4A is a flow chart illustrating a process flow, according to one implementation of the present invention, implemented at a wireless client.

FIG. 4B is a flow chart illustrating a process flow, according to one implementation of the present invention, implemented at a wireless client.

FIG. 5 is a data structure of an exemplary emergency information element according to one implementation.

FIG. 6 is a data structure of exemplary bandwidth uses according to one implementation.

FIG. 7 is a flow chart illustrating a process flow, according to one implementation of the present invention, implemented at a wireless access point.

FIG. 8A is a flow chart illustrating a process flow, according to one implementation of the present invention, implemented at a wireless access point.

DESCRIPTION OF EXEMPLARY EMBODIMENTS

A. Overview

The present invention provides methods, apparatuses, and systems directed to reliably providing emergency services to wireless clients in a wireless network. As described in more detail below, in one implementation, a wireless client determines whether the wireless network supports expedited or emergency bandwidth services. In one implementation, a wireless access point advertises its capabilities, which may include QoS and/or expedited bandwidth services. As described in more detail below, upon receipt of a notification that a wireless client has an expedited bandwidth request, the wireless access point may apply a policy to preferentially accept the expedited bandwidth request thereby providing prioritized access to QoS and emergency services for wireless clients.

B. Exemplary Wireless Network System Architecture

B. 1. Network Topology

A network environment including a wireless local area network (WLAN) according to one implementation of the present invention is shown in FIG. 1A. In a specific embodiment of the present invention, the system includes a wireless network management module 10 running on a WLAN management server 20, an Authentication Authorization and Accounting (AAA) server 22, a local area network (LAN) 30, a router 32, and wireless access points 50a, 50b, 50c, and 50d (collectively referred to as wireless access points 50). LAN 30 is implemented by a switch (or an array of switches) and/or other network devices, such as a bridge.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management server 20 and wireless clients via wireless access points 50. Of course, network 52 can include a variety of network segments, transmission technologies and components, such as terrestrial WAN links, satellite links, optical fiber links, and cellular links; network 52 could also be a campus LAN. LAN 30 may be a LAN or LAN segments implemented by an Ethernet/802.3 switch (not shown) or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (see FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points. Of course, configuration and management information can be obtained in a variety of manners without departing from the scope of the present invention.

B. 2. Central Controller

While FIG. 1A illustrates one implementation in which the wireless network management module 10 is implemented in the WLAN management server 20, in other implementations, wireless network management module 10 may be implemented in a central controller 70. FIG. 1B illustrates a hierarchical wireless network including a central controller 70, which may be used to manage bandwidth allocation of the wireless network according to one implementation of the present invention. In one implementation, the central controller 70 may be implemented as a wireless domain server (WDS) or, alternatively, as a wireless switch. If the central controller 70 is implemented with a WDS, the central controller 70 is operative to communicate with autonomous or so-called "fat" wireless access points. If the central controller 70 is implemented with a wireless switch, the central controller 70 is operative to communicate with light-weight wireless access points. Of course, other control points in the wireless network infrastructure can be used for the allocation of bandwidth described herein.

FIG. 1C illustrates for didactic purposes a hardware system 100, which may be used to implement a central controller 70 of FIG. 1B. As FIG. 1C shows, in one implementation, the central control elements each comprise a switch function or fabric 102 comprising a network interface 104a (e.g., a Ethernet adapter) for connection to network 52 and corresponding network interfaces 104b, 104c, and 104d for connection to the access elements, a processor 106, a memory 108, one or more software modules, stored in memory 108, including instructions for performing the functions described herein, and a system bus 110 operably connecting these components. The central control elements may optionally include an administrative network interface 112 allowing for administrative access for such purposes as configuration and diagnostic access.

B. 3. Wireless Access Point

FIG. 2 illustrates for didactic purposes a hardware system 300, which may be used to implement a wireless access point 50 of FIG. 1A. In one implementation, the wireless access point 300 comprises a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310.

B. 4. Wireless Client

FIG. 3 illustrates for didactic purposes a hardware system 400, which may be used to implement a wireless client 60 of FIG. 1. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. A wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

Additional elements of hardware system 400 are described below. In particular, wireless network interface 424 provides communication between hardware system 400 and any of a wide range of wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist, with the components of hardware system 400 being coupled to the single bus. Furthermore, hardware system 400 may include additional components, such as additional processors, storage devices, or memories.

In one embodiment, the operations of wireless client-side functionality are implemented as a series of software routines run by hardware system 400. These software routines, which can be embodied in a wireless network interface driver, comprise a plurality or series of instructions to be executed by a processor in a hardware system, such as processor 402 and may support one or more application programming interfaces (APIs). Initially, the series of instructions are stored on a storage device, such as mass storage 420. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in discrete hardware or firmware.

While FIG. 3 illustrates, for didactic purposes, the hardware architecture of a wireless client according to one implementation of the present invention, the present invention, however, may be implemented on a wide variety of computer system architectures, such as dual-mode cellular phones (e.g., cellular plus 802.11 capable devices), wireless VoIP phones, Personal Digital Assistants (e.g., converged devices which support WLAN data+voice and cellular), Laptop computers, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, Symbian operating systems, and the like.

C. Notification of Expedited Bandwidth Request

As described above, in one implementation, the wireless network interface driver of the wireless client determines whether one or more wireless access points supports QoS and expedited bandwidth services based on wireless management frames advertising such capabilities (or not advertising such capabilities). The wireless network interface driver supports APIs that allow wireless client applications (e.g., a VoIP application) to designate an emergency call or bandwidth use type or to select an expedited request type for the call. For example, the wireless client application may select one of the BW Use Values (FIG. 6) as appropriate. Other network applications may also do the same for their corresponding traffic streams. Such selections may be done during call signaling or subsequent to call signaling. In one implementation, during a 911 call, the wireless network estimates the location of the wireless client. In one implementation, the computed location can be provided back to the VoIP client application of the wireless client, or to other nodes. The computed location may be used, for example, to help locate the user in an emergency. In one implementation, the wireless client may optionally request location information from the wireless access points that support QoS and expedited bandwidth services, select a wireless access point, and notify the selected wireless access point that the wireless client has an expedited bandwidth request.

FIG. 4A is a flow chart illustrating a process flow, according to one implementation of the present invention, implemented at a wireless client 60. In one implementation, the inter-stream functionality described herein implemented by wireless client 60 may be embodied in a WLAN network interface driver and/or WLAN chip set firmware accessible to network applications that receive and/or transmit traffic streams through application programming interfaces (APIs). In one implementation, the expedited bandwidth services functionality residing on wireless client 60 is initiated based on calls made to it by a client application, such as a VoIP application. For example, in one implementation, the client application makes calls to the expedited bandwidth services functionality in connection with transmission or reception of a Session Initiation Protocol (SIP) INVITE message. As FIG. 4A illustrates, when the wireless network interface driver of the wireless client receives stream parameters (502), the wireless network interface driver determines whether the stream parameters include an expedited bandwidth request (504). If so, the wireless network interface driver stores and time stamps the request details (506), generates an expedited bandwidth information element (expedited bandwidth IE), and appends the expedited bandwidth IE to an ADDTS request (508). Expedited bandwidth IEs are described in more detail below.

The wireless network interface driver transmits the ADDTS request in a manner consistent with the IEEE 802.11e specification (510) or WMM specification. According to the 802.11e specification, the ADDTS request is a management frame that includes a TSpec information element (TSpec IE) that can be used to specify a requested set of QoS attributes, such as data rate, packet size, packetization interval, and priority. In one implementation, the stream for which QoS is requested is identified by a Traffic Stream Identifier (TSID) contained in the TSpec IE. As described in more detail below, after receipt of the ADDTS request from the wireless client, the wireless access point 50 processes the TSpec IE and the Expedited Bandwidth IE, and determines whether to grant the requested QoS for the identified stream. If the stream parameters do not include an expedited bandwidth request (504), the wireless network interface driver transmits the ADDTS request in a manner consistent with the IEEE 802.11e specification (510). After transmitting the ADDTS request, the wireless network interface driver passes response attributes of the ADDTS response frame to the wireless client application (512, 514), which can perform some action(s) in response to the message, such as retrying the request or beginning the voice stream.

The expedited bandwidth IE may be appended to other types of wireless management frames, such as re-association request frames. An exemplary process flow associated with roaming is described below in connection with FIG. 4B. In addition to 802.11e (ADDTS), the wireless infrastructure may also use expedited bandwidth IE during roam events. For example, as described above, as the wireless client roams, the wireless network interface driver may determine that a stream corresponding to an expedited bandwidth request is still active. FIG. 4B is a flow chart illustrating a process flow, according to one implementation of the present invention, implemented at a wireless client. As FIG. 4B illustrates, wireless client 60, during a roam event (552), determines if there is an active stream associated with a current expedited bandwidth request (556). If so, wireless client 60 appends the expedited bandwidth IE to a re-association request frame (558). Wireless client 60 then transmits the re-association request to the selected wireless access point (554, 560). If there is no current expedited bandwidth request (506), the wireless client then transmits the re-association request to the wireless access point without appending an expedited bandwidth IE (560).

C. 1. Expedited Bandwidth Request Information Element

As described below, an expedited bandwidth request indicates that the wireless client requires expedited bandwidth services from the wireless network for one or more designated traffic streams. In one implementation, the expedited bandwidth request may be related to a given identified traffic stream such that as long as the session/stream is alive, all packets in the stream (i.e., existing VoIP call) will be treated with the same QoS. In one implementation, the expedited bandwidth request may be an expedited bandwidth request information element (expedited bandwidth request IE). In one implementation, the wireless client notifies the wireless access point that a given message (e.g., emergency call) is associated with QoS or emergency service by generating an emergency notification identifier (i.e., an expedited bandwidth request information element), appending the emergency notification identifier to a wireless management frame, and then transmitting the wireless management frame to the wireless access point.

FIG. 5 is a data structure of an exemplary expedited bandwidth request IE according to one implementation. In one implementation, the expedited bandwidth request IE includes an element identification field, a length field, a traffic stream identification (TSID) field, and a bandwidth use field. In one implementation, the element ID identifies the IE as an expedited bandwidth request IE. In one implementation, the TSID field may contain the same value as that in the corresponding TSPEC IE (or TCLAS IE if present). As described in more detail below in connection with FIG. 6, in one implementation, the bandwidth use field contains a value that may identify a type or "use" of call (e.g., whether the call is emergency-related, and/or a user roll, or priority level).

In one implementation, the expedited bandwidth request IE may be a part of an 802.11e/WMM Add Traffic Stream (ADDTS) request, an association request, a re-association request, a Traffic Stream Specification (TSPEC) request, or another wireless management frame. According to the 802.11e specification, the ADDTS request is a management frame that includes a TSpec information element (IE) that can be used to specify a requested set of QoS attributes, such as data rate, packet size, packetization interval, and priority. In one implementation, the stream for which QoS is requested is identified by a Traffic Stream Identifier (TSID) contained in the TSpec IE. In one implementation, the expedited bandwidth request IE may be transmitted from a non-access point QoS station (non-AP QSTA) to a wireless QoS access point (QAP) in an Add Traffic Stream (ADDTS) action frame containing a TSPEC request.

FIG. 6 is a table that sets forth exemplary bandwidth (BW) use values and corresponding bandwidth use descriptors according to one possible implementation of the invention. In one implementation, the table of FIG. 6 defines an octet for bandwidth use, which enables a large range of bandwidth use types. For example, in one implementation, the lower the value of bandwidth use, the higher the relative priority. In one implementation, emergency calls have the highest priority. In one implementation, "emergency use" may be extended to include identified first responders. For example, a bandwidth use value may identify a call from a person designated as a public first responder (e.g., a member of a public safety organization such as a city fire department) or as a private first responder (e.g., a member of an enterprise security department). In one implementation, a bandwidth use value may be extended to include multi-level precedence and pre-emption (MLPP) codes, which may be supported. MLPP may be used as a subscription service to provide differentiated priority levels of consumer service. In one implementation, MLPP services are provided by other voice networking technologies such as 3GPP (cf. TS 22.067), H.323 (cf. ITU-T H4.60.14) and other proprietary signaling protocols (e.g., by military organizations). For example, military organizations may use the MLPP categories so that particular commanding officers have top priority (e.g., they would not get a network busy signal).

D. Processing an Expedited Bandwidth Request

As described above, in one implementation, a wireless access point advertises its capabilities, which may include QoS and/or expedited bandwidth capabilities. Upon receipt of an expedited bandwidth request IE, the wireless access point may apply one or more policies to preferentially admit one or more traffic streams associated with the expedited bandwidth request thereby providing prioritized access to QoS and emergency services for wireless clients.

FIG. 7 is a flow chart illustrating a process flow, according to one implementation of the present invention, implemented at a wireless access point 50 or a central controller 70. As described above, the wireless access point 50 advertises its capabilities, for example, in beacon frames, probe response frames, and other wireless management frames. In one implementation, such capabilities may include an 802.11e capability (for QoS transport), 802.11k/v capability (for location information), 802.11u capability (for expedited bandwidth requests), 802.11 security associations, etc. In one implementation, the WLAN infrastructure employs Robust Security Network (RSN) and 802.1x standards. In one implementation, authentication applies to Subscription Service Provider Network (SSPN) at Layer 3. In one implementation, the emergency service is suitable for voice services, data services, chat services, or any other service; and the advertisement also includes whether it supports VoIP service (e.g., support for end-to-end QoS) and/or data services. In one implementation, the SSPN provides the emergency service advertisement, as opposed to the wireless access point providing network access (so this requirement moves to the network selection cluster).

In one implementation, when the wireless access point 50 receives a management frame (602), the wireless access point 50 determines whether the wireless management frame includes an expedited bandwidth request IE (604). As described above, the expedited bandwidth request IE enables the wireless network infrastructure to differentiate a normal request for bandwidth from an emergency or expedited bandwidth request. If the wireless access point 50 has determined that it has received a notification that the wireless client has an emergency or priority message, the wireless access point identifies the type of bandwidth use from the bandwidth use field of the expedited bandwidth request IE (606). The wireless access point then determines if bandwidth is available (608). In one implementation, the wireless access point 50 determines whether it has sufficient bandwidth or network resources to satisfy the QoS parameters identified in the TSpec IE. If bandwidth is available, the wireless access point 50 reserves bandwidth resources for the traffic stream. If bandwidth is not available, the wireless access point reclaims bandwidth for the traffic stream (610). Examples of reclaiming are described in below.

D. 1. Reclaiming Bandwidth

The wireless access point 50 may reclaim bandwidth in a variety of ways. How the wireless access point may reclaim bandwidth may depend on the specific application and/or how a system administrator has configured the wireless network. For example, in one implementation, the wireless access point may terminate one or more existing connections with low-priority. In one implementation, the wireless access point may request or cause some wireless clients to roam. Alternatively, in one implementation, the wireless access point may use a pool of reserved or available pre-allocated bandwidth.

In one implementation, the wireless access point may capture bandwidth that is already pre-reserved for other purposes and use that bandwidth for emergency or priority calls. For example, a system administrator may set a threshold for voice services to reserve some bandwidth for mission-critical data. If the bandwidth already meted out is at the threshold, bandwidth reserved for mission-critical data may be used to carry an emergency call.

In some network configurations, a system administrator may allocate some OTA bandwidth for other services that also require admission control. Examples of such services include video conferencing or other services requiring real-time response from a WLAN. If the bandwidth already meted out for voice is at its threshold, bandwidth that is reserved for other services could be used to carry the emergency call or session.

In another possible implementation, bandwidth may be reserved for roaming-in calls, which is often performed in WLANs to prevent dropped calls. End-users complain when their call is dropped mid-stream more often than when they are not being able to initiate a new call. Such dropped calls result from insufficient capacity on the wireless access point to which the wireless client roams. To facilitate this feature, system administrators will often set aside a roaming reserve. In this example, if the only bandwidth available on the wireless access point corresponds to the roaming reserve, the wireless access point would go ahead and admit the bandwidth request using that reserve, thereby providing access to emergency services.

Another possible implementation scenario involves wireless network where a system administrator has defined policy that prevents VoIP calls. When the emergency bandwidth request IE is received on a service set identifier (SSID) configured to not accept calls (note, however, that a signaling session between and endpoint and call manager may previously exist for this example and be carried on the current SSID/virtual LAN (VLAN)), the wireless access point would go ahead and admit the bandwidth request anyway, thereby providing access to emergency services. Note that in this example additional security measures may need to be enforced by the WLAN infrastructure, which could include bandwidth policing to ensure that the request for emergency bandwidth is not a ruse for a DoS attack.

Another implementation involves call pre-emption. In this case, when a wireless access point receives an emergency bandwidth request IE, another voice flow that was not admitted with an emergency bandwidth request IE is terminated, thereby making room for the new emergency voice flow. This policy, if so configured by a system administrator, is preferably carefully implemented, because call pre-emption may have the negative side effect of tearing down calls related to the emergency. For example, if the original call becomes disconnected and the Public Service Answering Point (PSAP) calls back, this call back may not be designated as an emergency call to the WLAN infrastructure and may suffer from subsequent pre-emption (e.g., a Good Samaritan observing the emergency also calls to report it, causing the PSAP call back to be pre-empted.)

Reclaiming bandwidth is useful in cases where a designated access category is used to carry the emergency call traffic (typically AC_VO). In some cases, the wireless access point is configured for mandatory admission control. If the WLAN is congested, then the wireless access point may deny the TSPEC request for bandwidth to carry the call. One benefit of the expedited bandwidth request IE is that when the wireless access point has already meted out all available bandwidth, the wireless access point would admit the call anyway (assuming other policy issues would not prevent the admission). The wireless access point may be configured such that the wireless access point would accept the expedited bandwidth request if the wireless access point knows that a given call is an emergency call. In one implementation, because the wireless access point knows the "use" associated with the traffic stream, the wireless access point may optionally invoke a policy giving the expedited bandwidth request preferential treatment. For example, the wireless access point may take no action or take pre-emptive action (e.g., delete a traffic stream of lower priority if necessary to make room for a new traffic stream). Furthermore, the wireless access point may use bandwidth allocated for non-voice services if priority is above a certain value (assuming TSPEC is for AC_VO), interpret MLPP codes per 3GPP ($3^{rd}$ Generation Partnership Project, www. 3gpp.org) specification, and/or interpret MLPP codes per proprietary specification.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A computer-readable medium encoded with computer executable instructions for requesting over-the-air (OTA) bandwidth for an emergency call, the computer executable instructions when executed operable to cause a processor to:

access one or more wireless, link layer network management frames transmitted by a first wireless access point to determine whether Quality of Service and expedited bandwidth services are supported;

access an OTA bandwidth request corresponding to a Voice over Internet Protocol (VoIP) call, wherein the OTA bandwidth request is embodied in a wireless link layer network management frame;

generate an information element (IE) comprising one or more emergency codes that each identify an emergency aspect of the call;

attach the IE to the OTA bandwidth request for communication to the first wireless access point with the OTA bandwidth request, the IE facilitating preferential treatment of the OTA bandwidth request;

access a reassociation request generated in response to a roaming event and intended for a second wireless access point;

determine, in response to the reassociation request, whether the VoIP call is currently active; and if the VoIP call is currently active, attach the IE to the reassociation request prior to transmission to the second wireless access point.

2. The computer-readable medium of claim 1, wherein the OTA bandwidth request is a traffic stream QoS (ADDTS) request.

3. The computer-readable medium of claim 1, wherein the computer executable instructions are further operable to cause the processor to append the IE to the OTA bandwidth request to attach the IE to the OTA bandwidth request.

4. The computer-readable medium of claim 1, wherein at least one of the emergency codes identifying an emergency aspect of the VoIP call indicates whether a first responder associated with a public safety organization is placing the call.

5. The computer-readable medium of claim 1, wherein at least one of the emergency codes identifying an emergency aspect of the VoIP call indicates whether a member of an enterprise security team is placing the VoIP call.

6. The computer-readable medium of claim 1, wherein at least one of the emergency codes identifying an emergency aspect of the VoIP call indicates whether the VoIP call is an E911 call.

7. The computer-readable medium of claim 1, wherein the wireless access point is operable to communicate with one or more devices remote from the wireless access point according to 802.11.

8. The computer-readable medium of claim 1, wherein the preferential treatment of the OTA bandwidth request comprises providing reserved OTA bandwidth to the VoIP call.

9. The computer-readable medium of claim 1, wherein the preferential treatment of the OTA bandwidth request comprises providing OTA bandwidth allocated to particular services to the VoIP call.

10. A method for requesting over-the-air (OTA) bandwidth for an emergency call, the method comprising:

accessing one or more wireless, link layer network management frames transmitted by a first wireless access point to determine whether Quality of Service and expedited bandwidth services are supported;

accessing an OTA bandwidth request corresponding to a Voice over Internet Protocol (VoIP) call, wherein the OTA bandwidth request is embodied in a wireless link layer network management frame;

generating an information element (IE) comprising one or more emergency codes that each identify an emergency aspect of the VoIP call;

attaching the IE to the OTA bandwidth request for communication to the first wireless access point with the OTA bandwidth request, the IE facilitating preferential treatment of the OTA bandwidth request;

accessing a reassociation request generated in response to a roaming event and intended for a second wireless access point;

determining, in response to the reassociation request, whether the VoIP call is currently active; and if the VoIP call is currently active, attaching the IE to the reassociation request prior to transmission to the second wireless access point.

11. The method of claim 10, wherein the OTA bandwidth request is a traffic stream QoS (ADDTS) request.

12. The method of claim 10, wherein attaching the IE to the OTA bandwidth request comprises appending the IE to the OTA bandwidth request.

13. The method of claim 10, wherein at least one of the emergency codes identifying an emergency aspect of the VoIP call indicates whether a first responder associated with a public safety organization is placing the VoIP call.

14. The method of claim 10, wherein at least one of the emergency codes identifying an emergency aspect of the VoIP call indicates whether a member of an enterprise security team is placing the VoIP call.

15. The method of claim 10, wherein at least one of the emergency codes identifying an emergency aspect of the VoIP call indicates whether the VoIP call is an E911 call.

16. The method of claim 10, wherein the wireless access point is operable to communicate with one or more devices remote from the wireless access point according to 802.11.

17. The method of claim 10, wherein the preferential treatment of the OTA bandwidth request comprises providing reserved OTA bandwidth to the VoIP call.

18. The method of claim 10, wherein the preferential treatment of the OTA bandwidth request comprises providing OTA bandwidth allocated to particular services to the VoIP call.

19. A system for requesting over-the-air (OTA) bandwidth for an emergency call, the system comprising:

an endpoint operable to access one or more wireless, link layer network management frames transmitted by a first wireless access point to determine whether an emergency services capability is supported, establish a wireless, link layer connection with the first wireless access point, generate an OTA bandwidth request corresponding to a Voice over Internet Protocol (VoIP) call, wherein the OTA bandwidth request is a wireless, link layer network management frame, generate an information element (IE) comprising one or more emergency codes that each identify an emergency aspect of the call, attach the IE to the OTA bandwidth request, and communicate the OTA bandwidth request and the IE attached to the OTA bandwidth request to a wireless access point, generate a reassociation request in response to a roaming event intended for a second wireless access point, determine whether the call is currently active, and if the call is currently active, attach the IE to the reassociation request prior to transmission to the second wireless access point; and the first and second wireless access points, each operable to transmit one or more wireless, link layer network management frames advertising a QoS and emergency services capability, establish a wireless, link layer connection with the endpoint, receive the OTA bandwidth request and the IE attached to the OTA and give preferential treatment to the OTA bandwidth request as a result of one or more of the emergency codes in the IE.

* * * * *